United States Patent
Guillez et al.

(10) Patent No.: US 6,786,528 B2
(45) Date of Patent: Sep. 7, 2004

(54) MOTOR VEHICLE RETRACTABLE ROOF WITH PIVOTING ELEMENTS

(75) Inventors: Jean-Marc Guillez, Cirieres (FR); Gérard Queveau, Le Pin (FR)

(73) Assignee: France Design, Le Pin (FR)

( * ) Notice: Subject to any disclaimer, the term of this patent is extended or adjusted under 35 U.S.C. 154(b) by 0 days.

(21) Appl. No.: 10/416,325

(22) PCT Filed: Nov. 6, 2001

(86) PCT No.: PCT/FR01/03436
§ 371 (c)(1),
(2), (4) Date: Oct. 24, 2003

(87) PCT Pub. No.: WO02/36378
PCT Pub. Date: May 10, 2002

(65) Prior Publication Data
US 2004/0061354 A1 Apr. 1, 2004

(30) Foreign Application Priority Data
Nov. 6, 2000 (FR) .......................... 00 14187

(51) Int. Cl.$^7$ ................................. B60J 7/14
(52) U.S. Cl. ............. 296/108; 296/107.17; 296/107.18; 296/107.2
(58) Field of Search ............. 296/108, 107.01, 296/107.08, 107.09, 107.16, 107.17, 107.18, 107.19, 107.2

(56) References Cited

U.S. PATENT DOCUMENTS 2,704,225 A * 3/1955 Anschuetz et al. ......... 296/108
5,979,970 A * 11/1999 Rothe et al. ............ 296/107.17
6,053,560 A * 4/2000 Rothe ........................ 296/108
6,425,622 B2 * 7/2002 Eberle ........................ 296/108
2002/0135200 A1 * 9/2002 De Gaillard ........... 296/107.01

FOREIGN PATENT DOCUMENTS

DE         874860      * 4/1953

* cited by examiner

Primary Examiner—D. Glenn Dayoan
Assistant Examiner—Patricia Engle
(74) Attorney, Agent, or Firm—Nawrocki, Rooney & Sivertson, P.A.

(57) ABSTRACT

The invention concerns a motor vehicle retractable roof, comprising front (1), intermediate (2) and rear (3) roof elements. The displacement of the rear element (3) towards the rear deck is controlled by at least an arm (6) articulated to the vehicle chassis and to the rear element (3). The rear element (3) is linked to the intermediate element (2) through two levers (9, 10) forming a deformable quadrilateral. The intermediate element (2) is linked to the front element (1) through two other levers (15, 16) forming a deformable quadrilateral. The arm (16) is linked in articulation to one (10) of the two levers linking the rear (3) and intermediate (2) elements, through a hinge link (21). The other lever (9) linking the rear (3) and intermediate (2) elements is linked to one (16) of the levers linking the intermediate (2) and front (1) elements through a hinge link (24). The displacement of the rear element towards the rear deck (5) is further controlled by a finger (25) borne by the rear part (3) slidably engaged in a slide (28) extending inside the rear deck (5).

3 Claims, 1 Drawing Sheet

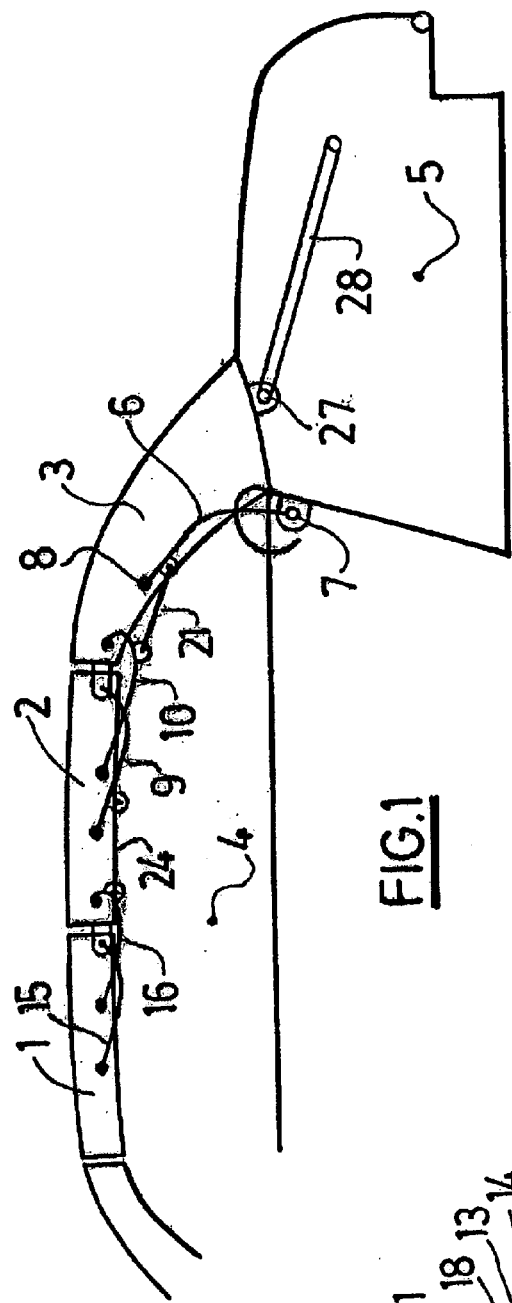
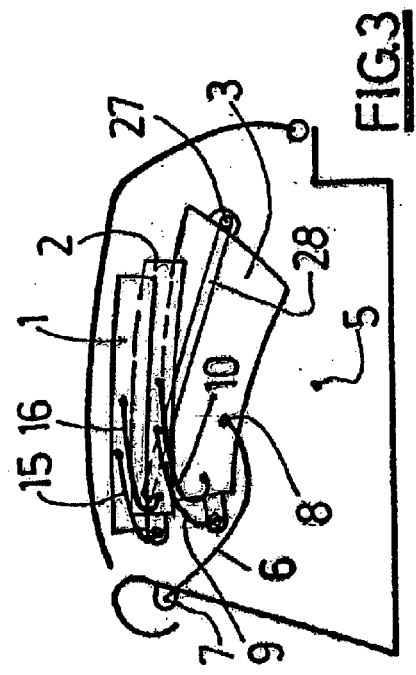
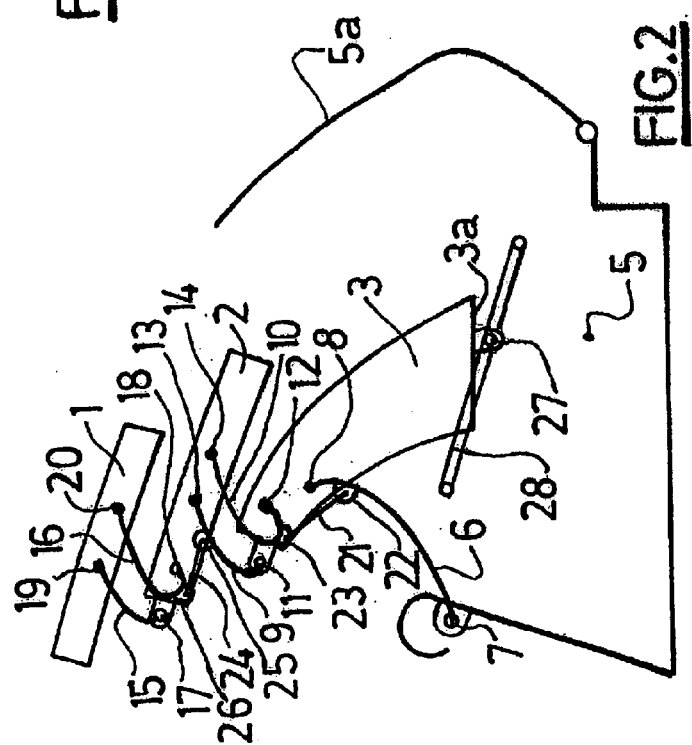

MOTOR VEHICLE RETRACTABLE ROOF WITH PIVOTING ELEMENTS

The present invention relates to a retractable roof or one which can be drawn back into the rear luggage compartment of a vehicle.

Such a retractable roof makes it possible in particular to convert a vehicle of the two-seater coupé or four-seater coupe or saloon type into a vehicle of the cabriolet type.

In the case of four-seater coupés or saloons, the roof is relatively long, so that the retractable roof consists of three elements, each of which must have a length compatible with the dimensions of the luggage compartment of the vehicle.

A vehicle retractable roof is thus known, comprising a front roof element, an intermediate roof element and a rear roof element, these three elements being movable between a position in which they cover the passenger compartment of the vehicle and a position in which they are superposed substantially horizontally in the rear luggage compartment of the vehicle.

The aim of the present invention is to provide improvements to the known means, in order to control and guide in an optimal manner the displacement of the roof elements between their closure position and their storage position in the luggage compartment.

According to the invention, the retractable roof is characterised in that the displacement of the rear element towards the luggage compartment is controlled by at least one arm articulated with the vehicle chassis and with the rear element, in that the rear element is connected to the intermediate element by two levers articulated with said rear element and with said intermediate element, these two levers forming a deformable quadrilateral, in that the intermediate element is connected to the front element by two other levers articulated with said intermediate element and with said front element, these two other levers forming a deformable quadrilateral, in that said arm is connected in an articulated manner to one of the two levers connecting the rear element and intermediate element, by a connecting rod articulated with said arm and with said lever, in that the other lever connecting the rear element and intermediate element is connected to one of the levers connecting the intermediate element and front element by a connecting rod articulated with said levers.

Other specific features and advantages of the invention will emerge further in the description below.

In the accompanying drawings, given by way of non-limitative examples:

FIG. 1 is a schematic view in partial longitudinal section of a vehicle equipped with a retractable roof according to the invention, in the closed position;

FIG. 2 is a view analogous to FIG. 1, the retractable roof being in an intermediate position;

FIG. 3 is a view analogous to FIGS. 1 and 2, the retractable roof being in a position stored in the luggage compartment of the vehicle.

In the embodiment depicted in FIGS. 1 to 3, the vehicle retractable roof comprises a front roof element 1, an intermediate roof element 2 and a rear roof element 3. These three elements 1, 2, 3 are movable between a position in which (see FIG. 1) they cover the passenger compartment 4 of the vehicle and a position in which (see FIG. 3) they are superposed substantially horizontally in the rear luggage compartment 5 of the vehicle.

In accordance with the invention, the displacement of the rear element 3 towards the luggage compartment 5 is controlled by an arm 6 articulated at 7 with the vehicle chassis and at 8 with the rear element 3.

The rear element 3 is connected to the intermediate element 2 by two levers 9, 10 articulated at 11, 12 with the rear element 3 and at 13, 14 with the intermediate element 2. These two levers 9, 10 thus form a deformable quadrilateral.

Furthermore, the intermediate element 2 is connected to the front element 1 by two levers 15, 16 articulated at 19, 20 with the front element 1 and at 17, 18 with the intermediate element 2. These two other levers 15, 16 thus form a second deformable quadrilateral.

The arm 6 is connected in an articulated manner to one of the two levers 9, 10 connecting the rear element 3 and intermediate element 2, by a connecting rod 21 articulated at 22 with the arm 6 and at 23 with the lever 10.

Moreover, the other lever 9 connecting the rear element 3 and intermediate element 2 is connected to one 16 of the levers connecting the intermediate element 2 and front element 1, by a connecting rod 24 articulated at 25, 26 with said levers 9 and 16.

As shown in particular by FIG. 2, the displacement of the rear element 3 towards the luggage compartment 5 is moreover controlled by a finger 27 carried by the rear part 3a of the rear element 3 fitted able to slide in a groove 28 extending inside the luggage compartment 5.

Instead of the groove 28 and the finger 27, the displacement of the rear element 3 towards the luggage compartment 5 could be controlled by a second arm (not depicted) articulated with the chassis and with the rear part 3a of the rear element 3.

The retractable roof which has just been described operates as follows:

After unlocking of the elements 1, 2, 3 and opening of the lid 5a, the arm 6 pivots towards the rear under the action of a motor or an actuator (not depicted). The movement of the arm 6 pulls the rear element 3 towards the rear while making the finger 27 slide along the groove 28.

The movement of the arm 6 pulls the connecting rod 21 and makes the lever 10 pivot upwards, while pulling the lever 9 in the same direction. The displacement of the levers 9, 10 upwards makes the intermediate element 2 pass above the rear element 3.

At the same time, the movement of the lever 9 pulls the connecting rod 24 which makes the lever 16 pivot upwards while pulling the lever 15 in the same direction and makes the front element 1 pass above the intermediate element 2, as shown in FIG. 2.

The above movements continue until the elements 3, 2, 1 are superposed substantially horizontally in the luggage compartment 5, as shown in FIG. 3.

In a simplified version of the invention, in particular in the case of coupes having only two seats, the retractable roof could have only the two elements 2 and 3.

What is claimed is:

1. A vehicle retractable roof comprising at least a rear roof element and a first roof element located in front of the rear roof element, these two roof elements being movable between a position in which they cover a passenger compartment of a vehicle and a position in which they are superposed substantially horizontally in a rear luggage compartment of the vehicle, wherein displacement of the rear roof element towards the rear luggage compartment is controlled by at least one arm articulated with the vehicle body and with the rear roof element, wherein the rear roof element is connected to the first roof element by two levers articulated with said rear roof element and said first roof element, these two levers forming a deformable quadrilateral, and wherein said at least one arm is connected in an articulated manner to one of the two levers connecting the rear roof element and the first roof element by a connecting rod articulated with said at least one arm and said lever, and wherein displacement of the rear roof element towards the rear luggage compartment is further controlled by a finger carried by a rear part of the rear roof element fitted to slide in a groove extending inside the rear luggage compartment.

2. The vehicle retractable roof according to claim 1, wherein said retractable roof further comprises an a second roof element located in front of the first roof element, the first roof element being connected to the second roof element by two other levers articulated with said first roof element and with said second roof element, these two other levers forming a deformable quadrilateral, the lever which is not connected to the at least one arm and connects the rear roof element and the first roof element is connected to one of the two other levers connecting the first roof element and the second roof element by a connecting rod articulated with said levers.

3. The vehicle retractable roof according to claim 1, wherein the displacement of the rear roof element towards the rear luggage compartment is moreover further controlled by a second arm articulated with the body and with part of the rear roof element.

* * * * *